July 14, 1953 — L. E. MUNCH — 2,645,542

CONDIMENT DRIER

Filed Jan. 30, 1950

INVENTOR.
LOUIS E. MUNCH.

BY *Howard J. Whelan*
ATTORNEY.

Patented July 14, 1953

2,645,542

UNITED STATES PATENT OFFICE 2,645,542

CONDIMENT DRIER

Louis E. Munch, Reisterstown, Md., assignor to James G. Saffell

Application January 30, 1950, Serial No. 141,285

2 Claims. (Cl. 312—31.1)

This invention relates to culinary shakers used for distributing salt and other condiments on food for the purpose of seasoning and taste. More particularly it refers to salt shakers of the conventional type that are made available on the table during eating occasions.

The common salt shaker is notorious for its tendency to allow the salt within it to become wet and caky. In this condition it is difficult to use, since the salt will not distribute properly through the holes in the cap, if at all. The user is compelled at times, to take off the cap of the shaker and pour the salt out bodily, in order to season his food. This is objectional and defeats the main object of the shaker, which is to distribute the salt easily, effectively and in relatively small controllable quantities. To overcome the difficulty, several arrangements have been employed, one of these is to mix rice or other grains among the salt for the purpose of breaking up the caking when the shaker is shaken to a size that will permit salt crystals small enough to pass through the holes in the caps. The specific use of a dehydrant or hygroscopic material for common salt in shakers has not been anticipated. This appears due to the fact that shakers did not seem suitable, by reason of their small size to the use of a hygroscopic material in close contact with their contents. Also the fact that the intimate connection between the salt and the food, that an individual is just about to consume, is not attractive to the average user, on general principles that are hard to overcome. Therefore invention in regard to this specific purpose has been avoided. However the applicant in this case, has seen fit to overcome the fallacy by providing for the use of a dehydrant directly disposed in the salt where it will positively collect and hold its moisture, and employing a dehydrant that is non-toxic and is of crystal form and will be retained in a perforated cartridge of suitable design.

It is therefore an object of the invention to provide a new and improved dehydrating salt shaker that will avoid one or more of the disadvantages and limitations of the prior art.

Another object of the invention is to provide a new and improved dehydrating salt shaker that will dehydrate the salt or condiment in a shaker in an effective manner while it is in the containing shaker.

A further object of the invention is to provide a new and improved salt shaker that will keep its contents dry and free flowing, and arranged for renewal of its dehydrating functions in a simple and inexpensive manner.

An additional object of the invention is to provide a new and improved shalt shaker that will employ a dehydrating cartridge that will absorb a relatively large amount of the moisture and can be readily removed and reactivated by heating and will not have any appreciable toxic effects.

Other objects will become apparent as the invention is more fully set forth.

For a better understanding of the invention, its objects, principles, and operation, reference is made to the accompanying drawings. The drawings indicate particular forms of the invention, by way of example, not of limitation, and described in more or less detail in the following description, while the claims emphasize the scope of the invention.

Referring to the drawings.

Similar reference numerals relate the same parts throughout the drawings.

Figure 1:
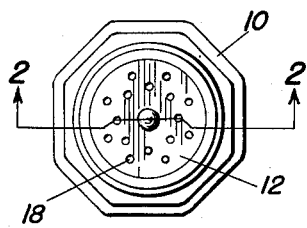
Figure 1 is a plan view of a salt shaker embodying this invention.
Figure 5:
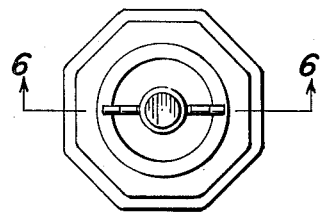
Figure 5 is a plan view of a modified form of cartridge suspended in a salt shaker with the cap removed.

A salt shaker 10 of conventional design is shown in the drawings. It has a screw threaded neck 11 on which a screw cap 12 is attached.

Figure 2:
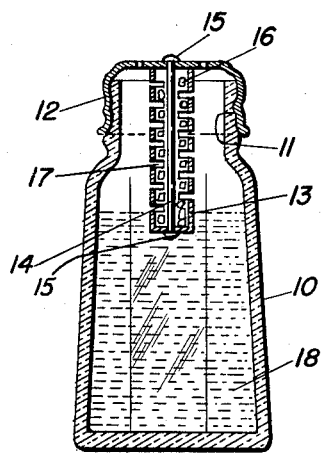
Figure 2 is a sectional view through the shaker taken longitudinally on line 2—2 of Figure 1.

The cap 12 supports and rigidly holds a hollow cartridge 13 by a stem 14 passing centrally through the latter axially and coming through the cap as indicated in Figure 2. The heads 15 of the stem are of rounded form and hold the parts together firmly. The cartridge walls and stem are of fire resistant material, but which is heat conducting. Such material can be of aluminum, chromium and other available metals generally resistant to corrosion and the effects of common salt (sodium chloride). The walls are preferably cylindrical and slotted horizontally at 17 in staggered or alternate planes and sufficiently narrow to prevent the dehydrant 16 from escaping. The slots are staggered to divert the air and moisture through the cartridge. The interior of the cartridge is filled with the dehydrant, which is of a non-toxic nature, such as silica gel, and access is had to it through the slots 17. The cartridge extends about half way down into the shaker 10 vertically and centrally, so that the shaking of the shaker can be done to mix up the shalt 18 thoroughly therein. The openings 18 are used for the emission or distribution of the salt, when it is tipped upside down and shaken.

Since the dehydrant absorbs considerable moisture it is apt to become saturated. When this happens the cap 12 is removed from the threaded neck with the cartridge attached to it and placed in the sun or on a hot plate or heated oven, where it is hot and dry, and left there for several minutes while the dehydrant dries out and is reactivated. The dehydrant is placed in the cartridge and the silica gel particles in the middle may not receive sufficient heat. To overcome this the stem 14 is used, since it will conduct heat and enable the dehydrant to be heated through and through, and therefore be dried completely.

Figure 6:
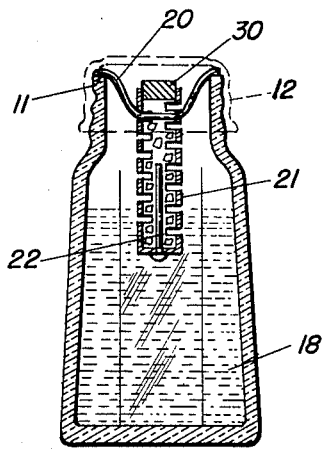
Figure 6 is a sectional view taken along line 6—6 of Figure 5.
Figure 3:
Figure 3 is a plan view of the cartridge used in this invention.
Figure 7:
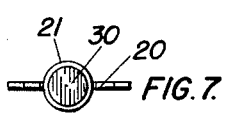
Figure 7 is a plan view of the cartridge used in this modification.
Figure 4:
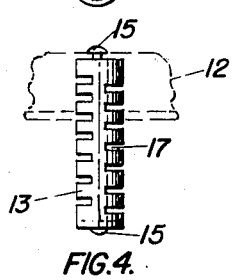
Figure 4 is a side elevation of Figure 3.
Figure 8:
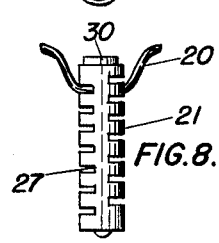
Figure 8 is a side elevation of Figure 7.

In the modified form shown in Figure 6, the cartridge 21 is not attached to the cap but is loosely suspended from the rim of the neck 11 by a loop of wire 20 and its end closed by stopper 30. The loop passes through the cartridge 21 at its top portion so it can swing freely and its free ends bent to rest on the bottle neck where the cap 12 may be screwed down to hold it in place. The cartridge 21 has staggered slots 27 and a stem 22 which passes through its middle similar to the form shown in Figure 6 serving the same purpose during heating but not necessarily being long enough for use as a suspension although it still could be if made long enough, and loosely suspended from the cap. The loose cartridge has the advantage of being available for stirring up the salt while the shaker is being vibrated, because it moves about from side to side in the bottle, and thus has an additional function to that of drying out the salt.

While emphasis has been placed on the use of the device with common salt, it is appreciated that the device can be used with other condiments used for culinary purposes that suffer from the same wetting effects. Therefore it is deemed necessary in this specification for the term salt to be broad enough to include all such condiments. Similarly, the dehydrant is intended to include such dehydrants as may be available for use with salt shakers that will have the same characteristics of being non-toxic, driable by heat, and suitable for use in a perforated cartridge without spilling the dehydrated material therefrom.

While but two general forms of the invention are shown in the drawings and described in the specifications, it is not desired to limit this application for patent to these particular forms, as it is appreciated that other forms could be made that would use the same principles and come within the scope of the appended claims.

Having thus described the invention, what is claimed is:

1. In combination with a condiment shaker having a neck and a body, of means for dehydrating the contents of the shaker, said means comprising a cylindrical cartridge extending from the neck to a point well within the body, said cartridge having a series of vertically spaced-apart and staggered slits in its walls, said cartridge containing a dehydrating substance, means for positively securing said cartridge to the shaker, and including a wire loop extending through the upper slits of the cartridge and having extensions resting on the edge of the neck of the shaker, whereby said wire loop and shaker are removable as a unit.

2. In combination with a condiment shaker having a neck and a body, of means for dehydrating the contents of the shaker, said means comprising a cylindrical cartridge extending from the neck to a point well within the body, said cartridge having a series of vertically spaced-apart and staggered slits in its walls, said cartridge containing a dehydrating substance, means for positively securing said cartridge to the shaker, and including a wire loop extending through the upper slits of the cartridge and having extensions resting on the edge of the neck of the shaker, whereby said wire loop and cartridge are removable as a unit, and a cap for the shaker to press against the aforesaid extensions to maintain the cartridge rigidly in the shaker.

LOUIS E. MUNCH.

References Cited in the file of this patent

UNITED STATES PATENTS

| Number | Name | Date |
|---|---|---|
| 822,638 | Vester | June 5, 1906 |
| 1,655,248 | Sharp | Jan. 3, 1928 |
| 2,492,830 | Bannister | Dec. 27, 1949 |
| 2,588,600 | Young | Mar. 11, 1952 |